April 14, 1925.　　　　　　　　　　　　　　　　　　1,533,240
F. F. FORSHEE
HOT TABLE
Filed Oct. 2, 1922　　　　2 Sheets-Sheet 1
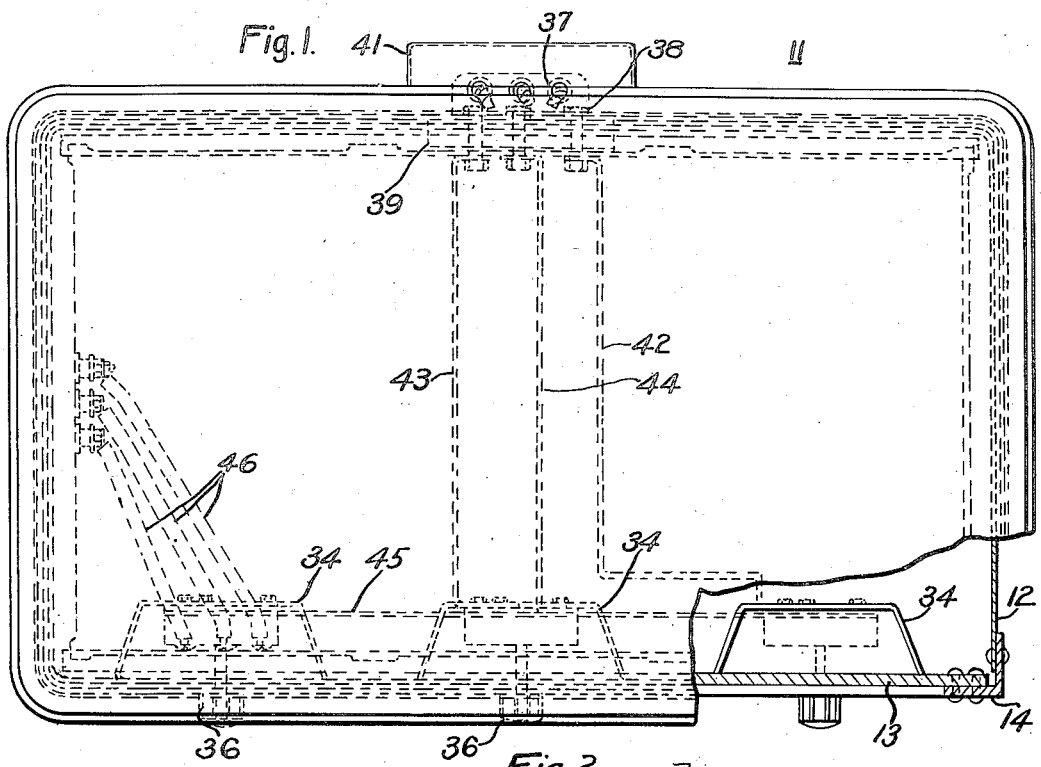
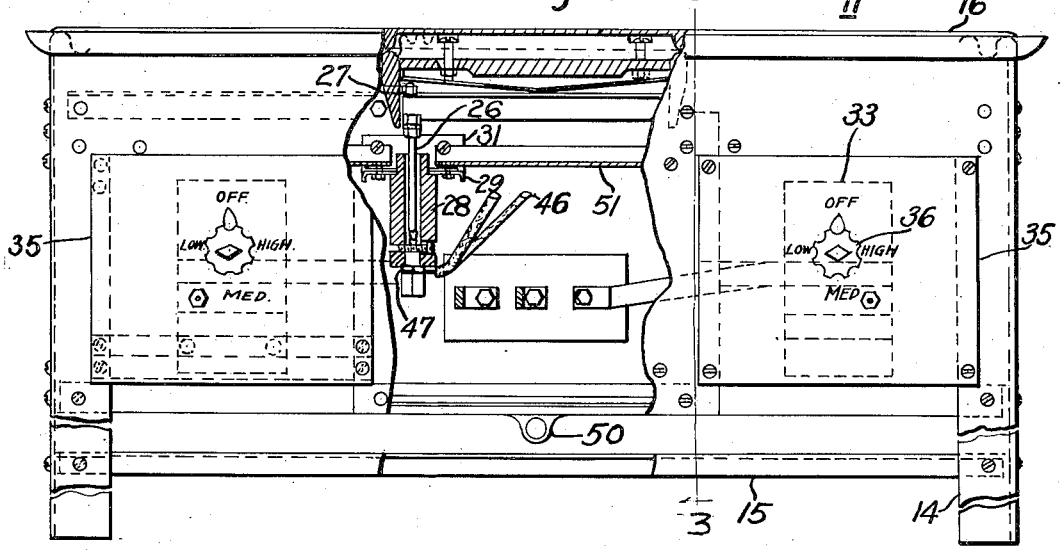
WITNESSES:
A. G. Schiefelbein
H. M. Biefeel
INVENTOR
Frank F. Forshee.
BY
Wesley L. Carr
ATTORNEY April 14, 1925.

F. F. FORSHEE

HOT TABLE

Filed Oct. 2, 1922

WITNESSES:

INVENTOR
Frank F. Forshee:
BY
ATTORNEY

Patented Apr. 14, 1925.

1,533,240

UNITED STATES PATENT OFFICE.

FRANK F. FORSHEE, OF MANSFIELD, OHIO, ASSIGNOR TO WESTINGHOUSE ELECTRIC PRODUCTS COMPANY, A CORPORATION OF MICHIGAN.

HOT TABLE.

Application filed October 2, 1922. Serial No. 591,763.

*To all whom it may concern:*

Be it known that I, FRANK F. FORSHEE, a citizen of the United States, and a resident of Mansfield, in the county of Richland and State of Ohio, have invented a new and useful Improvement in Hot Tables, of which the following is a specification.

My invention relates to electrically-heated apparatus and, particularly, to electrically-heated cooking devices.

One object of my invention is to provide an electrically-heated hot table having a quickly removable cooking surface and a plurality of quickly removable heating elements.

Another object of my invention is to provide means for reducing the amount of heat lost downwardly from the heating elements and to provide electric-circuit terminals that shall be so located as to operate at a relatively low temperature.

In practicing my invention, I provide a supporting frame, the upper part of which is constructed as a casing having an open top and bottom, a cooking surface removably mounted thereon and a plurality of multi-heat electric-heating elements removably supported in the casing closely adjacent to and beneath the cooking surface. I provide a baffle plate in the casing intermediate the cooking surface and the bottom plate and a plurality of electric-circuit terminals located below said baffle plate which are operatively engaged by depending contact terminals secured to the heating elements.

In the drawings,

Figure 1 is a top plan view of a hot table embodying my invention, portions thereof being cut away;

Fig. 2 is a view thereof, in front elevation, certain portions being cut away to show the interior construction;

Figure 3:
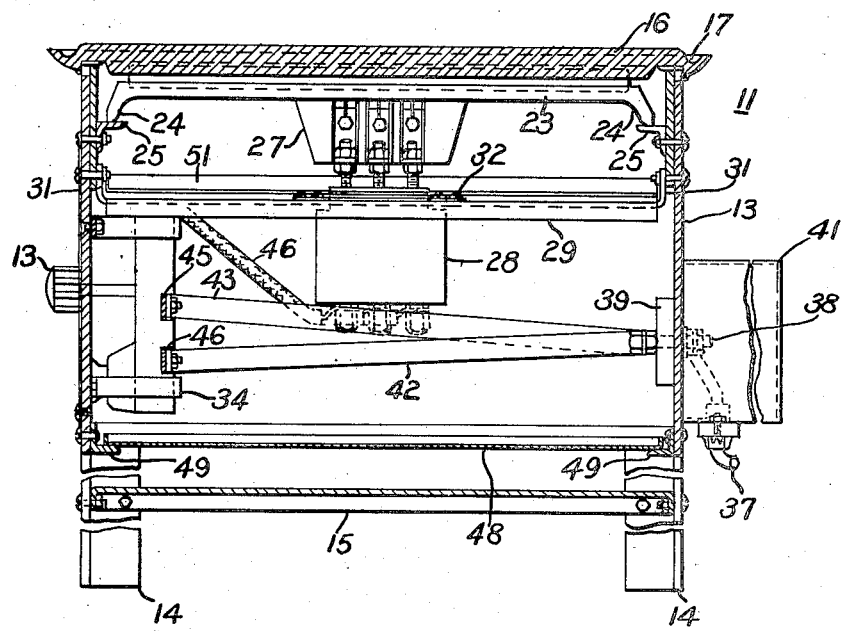
Fig. 3 is a view, in vertical lateral section, taken on the line 3—3 of Fig. 2.
Figure 4:
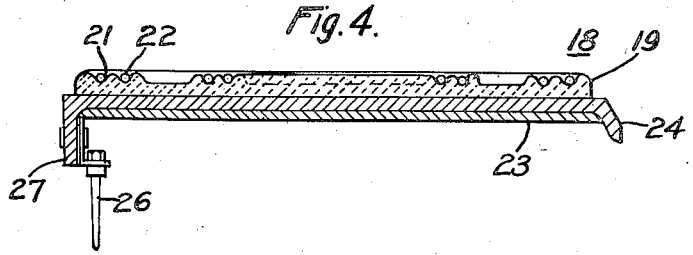
Fig. 4 is a view, in vertical longitudinal section, of a heating element comprising a portion of the device embodying my invention.

A hot table, designated generally by the numeral 11, comprises a supporting frame built up of side plates 12, front and rear plates 13 and combined corner angle bars and supports 14. Any desired method of securing the edges of the plates 12 and 13 to the angles 14 may be employed. A truss pan 15 may be provided below the upper body portion of the hot table in order to provide a surface upon which cooking utensils or material to be cooked upon the hot table may be placed.

A cooking surface 16, supported on the top of the casing comprising the side and front and rear plates, comprises a relatively thin casting of iron or any other metal adapted to the purpose, which casting is provided with a peripheral groove 17 in order to catch any drippings or waste material.

A plurality of heating elements 18 is provided, each heating element comprising a refractory resistor-supporting plate 19 having a plurality of grooves 21 in the upper surface thereof within which a resistor member 22, of any suitable type or construction, may be located. The refractory plate 19 is secured to the upper surface of a cast-metal supporting plate 23 which is provided, at the front and the rear edges, with depending feet or supporting members 24 to operatively engage, and rest upon, supporting angle bars 25 which are bolted or otherwise secured to the front and the rear plates 13. The vertical location of the supports 25 is such that the upper surfaces of the heating element 18 is closely adjacent to, and immediately below, the under surface of the cooking surface 16 in order that the heat path between the heating element and the cooking surface shall be relatively short.

As it is desired to be able to obtain a plurality of heats in each of the heating elements 18, three contact terminal pins 26 are insulatedly mounted on a depending flanged portion 27, integral with the plate 23 to which the ends of the divided resistor member are electrically connected, in a manner well known in the art, to permit of connecting the sections of the resistor in a plurality of relations to each other to permit of varying the energy translated thereby.

A plurality of electric-circuit terminal blocks 28 are mounted in spaced relation within the body of the casing hereinbefore described, supported by laterally-extending members 29, of substantially channel section, having upturned end portions 31 for securing the same to the front and the rear plates 13. Any suitable means, such as screws 32, may be employed to secure the terminal blocks 28 to the respective members 29.

A plurality of multi-heat switches 33 are located in spaced relation immediately back of the front plate 13 and are held in place by supporting straps 34, the ends of which are suitably secured against the inner face of the front plate 13. In order to provide a finished appearance, a finish plate 35 may be employed in front of each of the switches 33, although this is not an essential element of my invention. Switch knobs 36, located in front of the plate 13, permit of the operator actuating the respective switches as may be required.

The ends of the electric-circuit supply conductors 37 are brought to supply-circuit terminals 38, which are located on an insulating block 39, secured against the rear plate 13, a box or cover member 41 being provided to suitably cover and protect the terminal members 38. Bus-bar members 42, 43 and 44 extend from the respective supply-circuit terminals 28 to cross-connecting bus-bars 45 and 46 which electrically connect the respective terminals of the switches 33 so that any of the heating elements may be energized with varying inputs. Conductors 46 connect the terminals of the respective switches 33 to contact sockets 47 provided in the respective contact blocks 28.

In order to reduce the amount of heat, which may be radiated or otherwise lost, downwardly from the bottom of the heating elements, a baffle plate 48, preferably made of aluminum, is located below the heating elements and the bus-bars and is supported adjacent the bottom edge of the front, rear and side plates on angle bars 49, suitably secured to the casing.

A luminous current indicator 49 may be secured to the bottom of the front plate 13 and may be of the type more particularly disclosed and claimed in my copending application, Serial No. 426,996, filed March 29, 1920.

If it is desired to heat the entire surface of the top plate, a substantially uniform temperature throughout the entire surface thereof is obtainable. If, on the other hand, it is desired to employ only a portion of the baking surface, as, for example, in the design illustrated where three heating elements are embodied in the device, it is possible to conduct cooking operations at one end of the hot plate without serious loss of heat or without danger of the temperature of a portion of the plate being too low to properly cook material placed thereon.

The construction embodied in my invention permits of easily and quickly removing the cooking surface and of also easily and quickly removing the loosely-mounted heating elements whereby a damaged heating element may be quickly repaired or replaced.

If desired, a second baffle plate 51 may be located immediately below the heating elements in such position as to separate the depending flanged members 27 of the heating elements from the respective terminal blocks 28 in order to insure that the temperature of the interengaging contact members shall be relatively low, thereby obviating any difficulty due to oxidization of the contact members.

Various modifications may be made in my invention without departing from the spirit and scope thereof, and I desire, therefore, to be limited only by the scope of the appended claims.

I claim as my invention:—

1. In an electrically-heated hot table, in combination, a supporting frame, a plurality of heating elements located in side-by-side relation in and supported by said frame, depending contact terminals on each of said heating elements, a plurality of electric-circuit terminals for operatively engaging said contact terminals supported by said frame, and a cooking surface removably located on and supported by said frame.

2. In an electrically-heated hot plate, in combination, a supporting frame having an open top and bottom, a cooking surface supported at the top of said frame, a plurality of electric-heating elements supported by said frame beneath and closely adjacent to said cooking surface, a metallic baffle plate located below said heating elements and spaced apart therefrom, electric-circuit terminals supported by said frame below said baffle plate, and terminal members for said heating elements secured thereto and depending therefrom and operatively engaging said electric-circuit terminals when the heating elements are placed in proper operative position in said frame.

3. In an electrically-heated hot plate, in combination, a supporting frame having an open top and bottom, a cooking surface supported at the top of said frame, a plurality of electric-heating elements supported by said frame beneath and closely adjacent to said cooking surface, a metallic baffle plate located below said heating elements and spaced apart therefrom, electric-circuit terminals supported by said frame below said baffle plate, terminal members for said heating elements secured thereto and depending therefrom and operatively engaging said electric-circuit terminals when the heating elements are placed in proper operative position in said frame, and a plurality of switches for varying the energization of said heating elements supported by said frame below said baffle plate.

4. In an electrically-heated hot table, in combination, a supporting frame, a cooking surface supported by the top of said frame, a plurality of electric-heating elements supported by said frame beneath and closely adjacent to said cooking surface, controlling switches for said heating elements supported at the front of said frame, supply-circuit terminal members located at the back of said frame and supported thereby, and a plurality of bus bars electrically connecting said terminal members and said controlling switches.

5. In an electrically-heated hot table, in combination, a supporting frame, a cooking surface supported by the top of said frame, a plurality of electric-heating elements supported by said frame beneath and closely adjacent to said cooking surface, controlling switches for said heating elements supported at the front of said frame, supply-circuit terminal members located at the back of said frame and supported thereby, a plurality of bus bars electrically connecting said terminal members and said controlling switches, and a baffle plate located beneath said heating elements for reducing the amount of heat flowing downwardly from said heating elements to said controlling switches, bus bars and supply-circuit terminal members.

In testimony whereof, I have hereunto subscribed my name this 15th day of Sept. 1922.

FRANK F. FORSHEE.